United States Patent [19]

Oswald

[11] 4,215,730
[45] Aug. 5, 1980

[54] METHOD AND APPARATUS FOR DEPOSITING MATERIAL INTO A MOVING RECEPTACLE

[75] Inventor: Leo A. Oswald, Huntingdon, Pa.

[73] Assignee: Owens-Corning Fiberglas Corporation, Toledo, Ohio

[21] Appl. No.: 878,559

[22] Filed: Feb. 17, 1978

Related U.S. Application Data

[63] Continuation of Ser. No. 651,308, Jan. 22, 1976, Pat. No. 4,075,301.

[51] Int. Cl.² .......................... B65B 3/04; B29C 1/00
[52] U.S. Cl. .................................. 141/1; 141/167; 264/40.7
[58] Field of Search .................. 118/7, 8, 323, ; 222/52; 264/40.1, 40.5, 40.7, 54; 141/1–12, 129–192, 100–110; 425/145, 150, 152, 375, DIG. 200, DIG. 201

[56] References Cited

U.S. PATENT DOCUMENTS

| | | | |
|---|---|---|---|
| 1,903,570 | 4/1933 | Keemmling | 425/375 |
| 2,522,031 | 9/1950 | Gavin | 141/137 |
| 2,754,795 | 7/1956 | Enssle | 118/323 |
| 3,034,475 | 5/1962 | Bowman | 118/323 |
| 3,040,381 | 6/1962 | Ploch | 264/54 |
| 3,247,295 | 4/1966 | Burwell | 425/150 |
| 3,505,707 | 4/1970 | Villain | 264/49 |
| 3,537,489 | 11/1970 | Haul | 141/137 |
| 3,606,162 | 9/1971 | Lehmann | 118/323 |
| 3,621,522 | 11/1971 | Woodhall | 425/817 R |
| 3,801,255 | 4/1974 | Meyer et al. | 425/145 |
| 3,895,601 | 7/1975 | Takeuchi | 118/323 |

*Primary Examiner*—Houston S. Bell, Jr.
*Attorney, Agent, or Firm*—Ronald C. Hudgens; Philip R. Cloutier; Ted C. Gillespie

[57] ABSTRACT

A method and apparatus of depositing material into a moving receptacle is disclosed. A traveling discharge device moves across a receptacle while discharging material into the receptacle. The discharge device uses the receptacle itself as its frame of reference and thus can compensate for imperfections in both the speed and the path of the receptacle.

18 Claims, 9 Drawing Figures

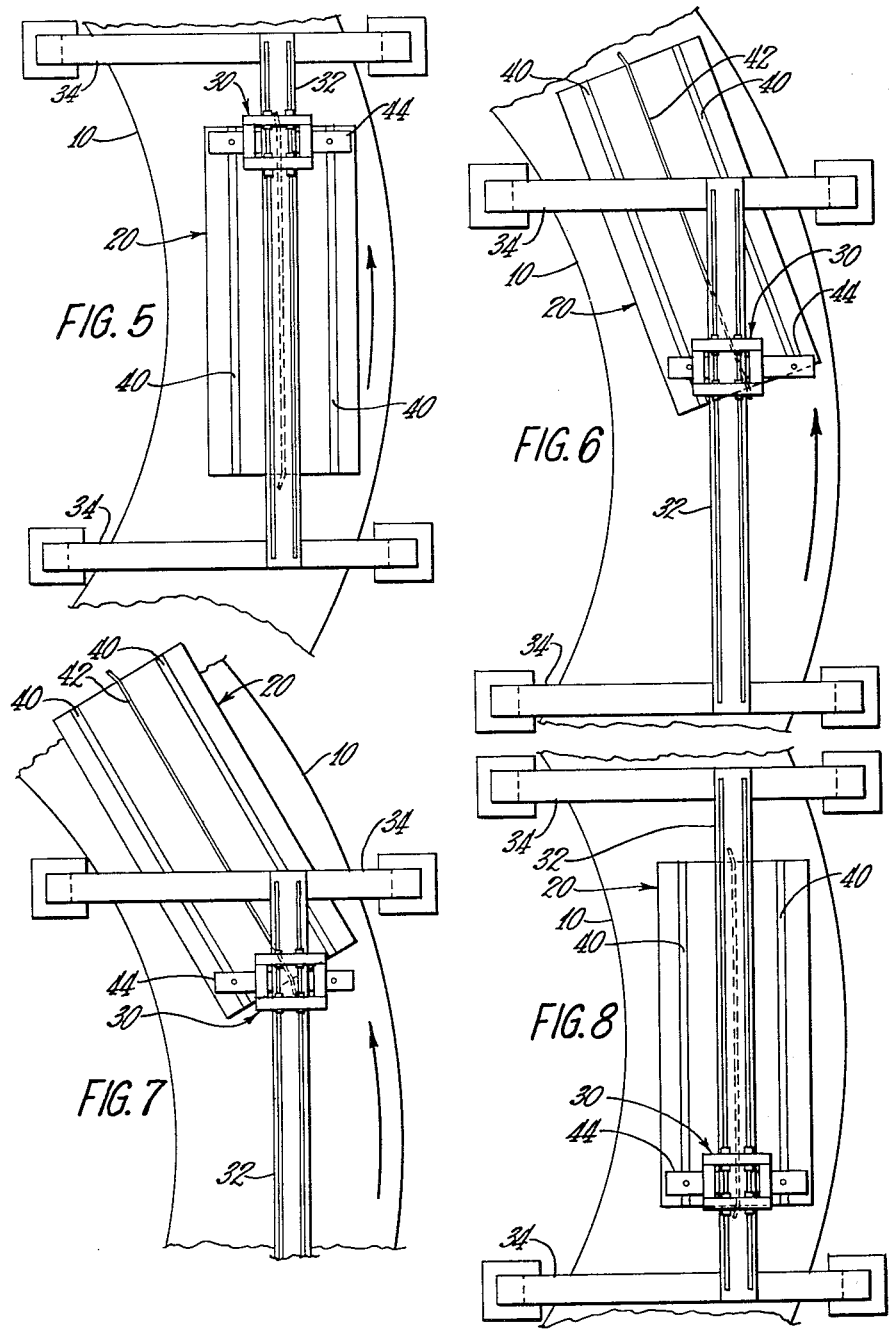

METHOD AND APPARATUS FOR DEPOSITING MATERIAL INTO A MOVING RECEPTACLE

This application is a continuation of applicant's U.S. Pat. No. 4,075,301 which was filed on Jan. 22, 1976, as application Ser. No. 651,308.

The present invention relates to apparatus for, and a method of, depositing or pouring material in a controlled manner into a movable receptacle such as a traveling mold.

It is a common practice when depositing material into receptacles to deposit material from a stationary discharge source, and to position receptacles beneath the discharge source to receive the material discharged. For an automatic process of depositing material it is a common practice to mount receptacles on a conveyor and pass the receptacles beneath a stationary dispensing device in order to be positioned for the deposit of the material. Advances in the art of depositing material into receptacles have resulted in the use of a traveling pouring device which travels across the moving receptacles during the deposit of the material. This method is useful when the receptacle is of large size in relation to standard pouring equipment. The use of traveling discharge device is especially advantageous where it is necessary to deposit the material more quickly than can be accomplished with a stationary discharge device because the discharge device can travel in relation to the receptacle much faster than the receptacle, itself, is moving. Thus, the relative speed between the discharge device and the receptacle may be greatly increased.

One of the problems associated with pouring material into a moving receptacle with a traveling discharge device is that of improper alignment between the receptacle and the discharge device. Existing pouring methods utilize a traveling discharge device which travels in relation to the receptacle along a fixed path or track. Since the frame of reference for such a path is fixed with respect to the ground, misalignment between the receptacle and the discharge device results in a spilling of the material to be deposited. Misalignment of the receptacles can be caused by vibration or other normal operating forces associated with traveling receptacles. The problem of misalignment is even more acute when the receptacles are traveling on a conveyor which does not travel in a straight line, such as a circular conveyor or carrousel.

Another problem associated with pouring material into traveling receptacles is that of timing the pouring cycle. The timing of the pouring cycle is commonly controlled by causing the discharge nozzles to pour at a constant discharge rate and to travel at a constant speed. Any slowing or stopping of the conveyor during a pouring sequence where the pouring methods heretofore known are used, causes an overfilling of the receptacle because the discharge device continues at the predetermined speed relative to the ground. Thus the conveyor must necessarily travel at the predetermined constant speed in order to avoid wastage and spilling. In addition, the requirement of running the conveyor at a predetermined constant speed can cause inefficiencies in, or total stoppage of, the pouring process when other steps of the assembly line (such as removing the material from the receptacles) require a temporary slowing down of the conveyor.

In an attempt to overcome the problem of timing and sensing variations in the speed of the receptacles, some of the existing pouring systems utilize a pouring device which travels in unison with the receptacle. This solution does not solve timing problems where it is necessary to traverse the pouring device across the receptacle. Burwell in U.S. Pat. No. 3,247,295 attempted to solve the problem by providing cams along the length of the receptacle. The operation of the cams purports to allow the pouring operation to proceed at a rate responsive to the speed of the receptacle. This device fails to completely solve the timing problem, however, because the stopping of the receptacle in between two cams would cause an unabated discharge of material into the receptacle until it eventually overflows.

The present invention solves these problems by providing a material discharging method and apparatus which uses the receptacle as the frame of reference for movement of the discharge device. The discharge device travels relative to the receptacle and continuously senses the motion of the receptacle in order to travel on the correct path and at the correct speed. Deviations in the planned speed or path of the receptacle are compensated for by the traveling discharge device. The phrase "Movement of the receptacle" is intended to mean any change of speed, position or orientation of the receptacle.

According to this invention there is provided a method and apparatus for depositing material in a controlled manner into a movable receptacle.

Also, according to this invention there is provided a method and apparatus for depositing material into a movable receptacle in which a control means senses movement of the receptacle and moves a discharge device in a defined pattern of speeds relative to the receptacle. The sensing of the movement of the receptacle can be accomplished through contact between the control means and the receptacle. The sensing can also occur without contact between the control means and the receptacle. For example, signal emitting devices, such as light source, can be placed on the receptacle, and a sensor means, such as a photocell, associated with the control means, can control the speed of the discharge device in response to the perceived speed of the receptacle.

Also, according to this invention there is provided a method and apparatus for depositing material into a movable receptacle in which a control means senses movement of the receptacle and moves a discharge device according to a defined path relative to the receptacle. The sensing of the movement of the receptacle can be accomplished through contact between the control means and the receptacle. The sensing can also occur without contact between the control means and the receptacle. For example, a sensor means, such as a photocell, associated with the control means can read a pattern of signals from signal emitting devices, such as light sources, on the receptacle, and can direct the discharge device along the proper path relative to the receptacle.

The principles of this invention are more fully understood by reference to an embodiment comprising a pouring operation for a molding device. The pouring operation will be more easily understood by reference to the following drawings:

FIG. 5 is a schematic of the molding device at the beginning of a pouring cycle where the discharge carriage will be traversing the mold in a direction opposite the movement of the mold.

FIG. 6 is a schematic of the molding device of FIG. 5 at the end of a traverse where the carrousel and mold have traveled at full speed during the entire traverse.

FIG. 7 is a schematic of the molding device of FIG. 5 at the end of a pouring cycle where the carrousel and mold have traveled at full speed during the entire cycle.

FIG. 8 is a schematic of the molding device of FIG. 5 at the end of a traverse where the carrousel and mold have stopped immediately afer commencement of the pouring cycle.

While the apparatus and the method of this invention are especially useful in pouring a moldable composition such as a polyurethane foam into a mold, it is to be understood that the invention can also be used advantageously in depositing other material into other receptacles. The invention is particularly useful wherever it is advantageous to disperse material evenly or in a controlled pattern in rapid order into a moving or movable receptacle. The following description of an embodiment of this invention is not intended to be limiting, but rather is offered for purposes of illustration.

The preferred embodiment of this invention utilizes a guide member mounted on a traveling mold to guide the discharge device in its traverse of the mold. The guide member is comprised of a vertically upstanding member affixed to the receptacle. The guide member is preferably parallel to, and equidistant from, the two mold openings. Mounted on the discharge carriage is an engaging means, preferably a pair of rollers or wheels rotating in a horizontal plane and grasping the guide member in a wringer-type relation to drive the discharge carriage. The wheels can be so mounted as to allow free lateral movement relative to the discharge carriage. The wheels can be driven by a motor, and when the motor is engaged, the wheels can contact the guide member and drive the discharge carriage relative to the mold. Since this driving operation preferably involves direct driving contact between the wheels and the guide member, the movement of the discharge carriage is relative to the mold itself. Consequently, variations in the speed of the mold do not affect the relative speed between the mold and the discharge carriage.

A brake allows the wheels to grasp the guide member, and, when engaged, prevents relative movement between the discharge carriage and the mold.

The material to be discharged is dispersed through discharge heads which are fixedly positioned from the drive wheels. The guide member therefore determines the lateral location of the discharge heads in addition to the lateral location of the drive wheels.

Figure 1:
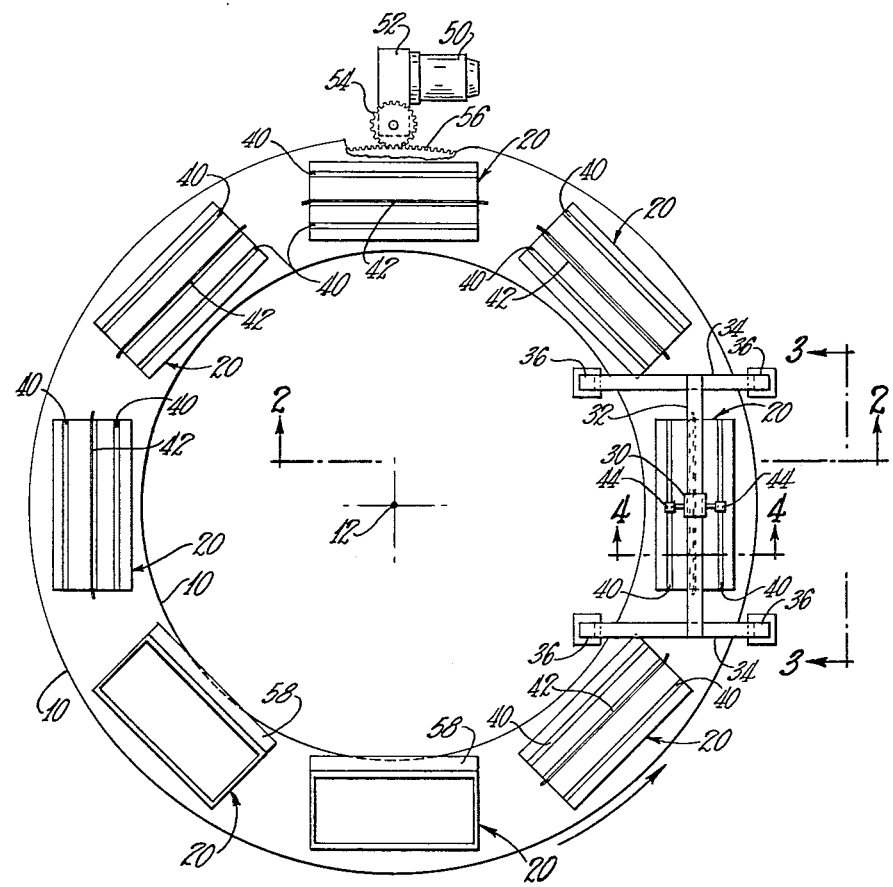
FIG. 1 is a general diagrammatic plan view of a molding device.

Referring now to FIG. 1, apparatus which produces molded objects of polyurethane foam according to the principles of this invention is shown. The circular conveyor or carrousel revolves about its axis. Molds mounted on the carrousel travel in a counter-clockwise direction. The molds are filled with the foamable composition as they pass through the pouring area, shown at the right hand side of FIG. 1. The pouring is done through discharge heads mounted on a discharge carriage which traverses the length of the mold as the mold passes through the foam pouring area. As the molds pass out of the foam pouring station the discharge carriage returns to its original, or "home", position and openings in the mold for receiving the foamable material are closed and the foam is cured. By the time the mold reaches the station where the molded article is removed, shown at the bottom of FIG. 1, the foam is cured. The lids of the molds are opened, the molded article removed, and the mold is prepared for another molding cycle.

Referring now in more detail to FIG. 1, the carrousel 10 revolves about its axis 12 in a counter-clockwise direction. The carrousel is driven by the variable speed motor 50. The motor acts through the reducer 52 and driving gear 54 to drive the geared portion 56 on the underside of the carrousel, as shown in the cutaway portion at the top of FIG. 1. The variable speed feature of the motor allows the carrousel to be speeded up or slowed down as needed, and the traveling discharge carriage will compensate for such speed changes. The variable speed capability allows a slowing down of the carrousel for handling such problems as temporary mold cleaning difficulties or inexperienced labor. The speed of the carrousel can also be varied to match that of an adjoining process, such as an assembly process using the completed molded objects.

As shown in the foam pouring station at the right hand side of FIG. 1, the discharge carriage 30 is so mounted as to be able to traverse the length of each mold 20 in the clockwise direction as the mold passes beneath the discharge carriage. Two discharge heads (not shown in FIG. 1) depend from the discharge carriage. As the carriage traverses the length of each mold, the discharge heads disperse the foamable material into the mold. When the discharge carriage reaches the end of the mold the traverse is completed and the discharge carriage stops moving relative to the mold. The brake is engaged and the discharge carriage then moves with the mold in a counter-clockwise direction until the original or home position is reached. When the discharge carriage reaches its home position the brake is released and the carriage stops moving with the mold, and remains stationary with respect to the ground, in the home position. The mold continues to move in the counter-clockwise direction out of the pouring area.

The discharge carriage is mounted for travel on a track, here supported by a suitable structural arrangement comprising a beam 32, cross beams 34 and posts 36.

Each mold has mold openings 40 which receive the foamable composition which is discharged by the discharge heads. The mold openings are closable to provide for a closed mold during the curing phase of the molding cycle. Running along the length of the mold is a guide member 42, which guides the discharge carriage during the traverse. The discharge heads depend from the ends of a head spacer bar 44 which in turn depends from the discharge carriage. The head spacer bar is a mounting means for the discharge heads and maintains the lateral separation between the discharge heads in order to keep them apart the same distance as the distance between the mold openings. The head spacer bar is physically guided by the guide flange in the lateral direction in order to maintain the discharge heads in discharge relation with the mold openings 40, i.e., with the heads positioned directly over the openings during the traverse of the mold.

Each mold has a top 58 which is openable for removal of the molded object after curing. At the bottom of FIG. 1 two of the molds are shown in open position, with the tops laid back for removal of the molded object and for preparation of the mold for a new molding cycle.

Figure 2:
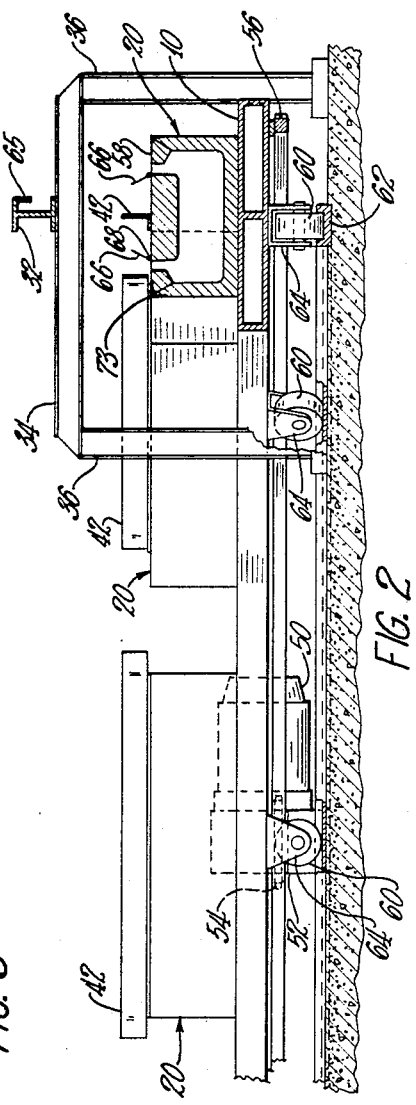
FIG. 2 is a general diagrammatic elevation view of the device as seen along the line 2—2 in FIG. 1.

As shown in FIG. 2 the carrousel is rotatably mounted by means of wheels 60, a track 62 and wheel housings 64, although other mounting means could be employed.

Figure 3:
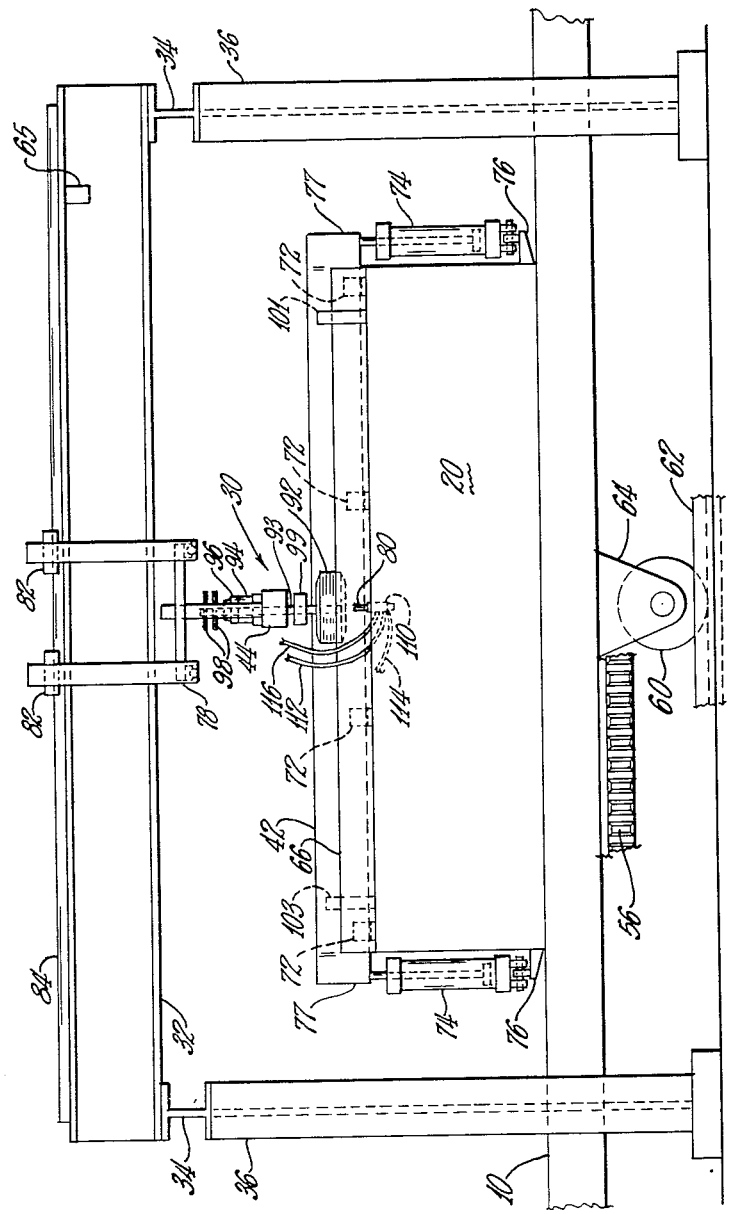
FIG. 3 is a side elevation view of the molding apparatus as seen along the line 3—3 of FIG. 1.
Figure 4:
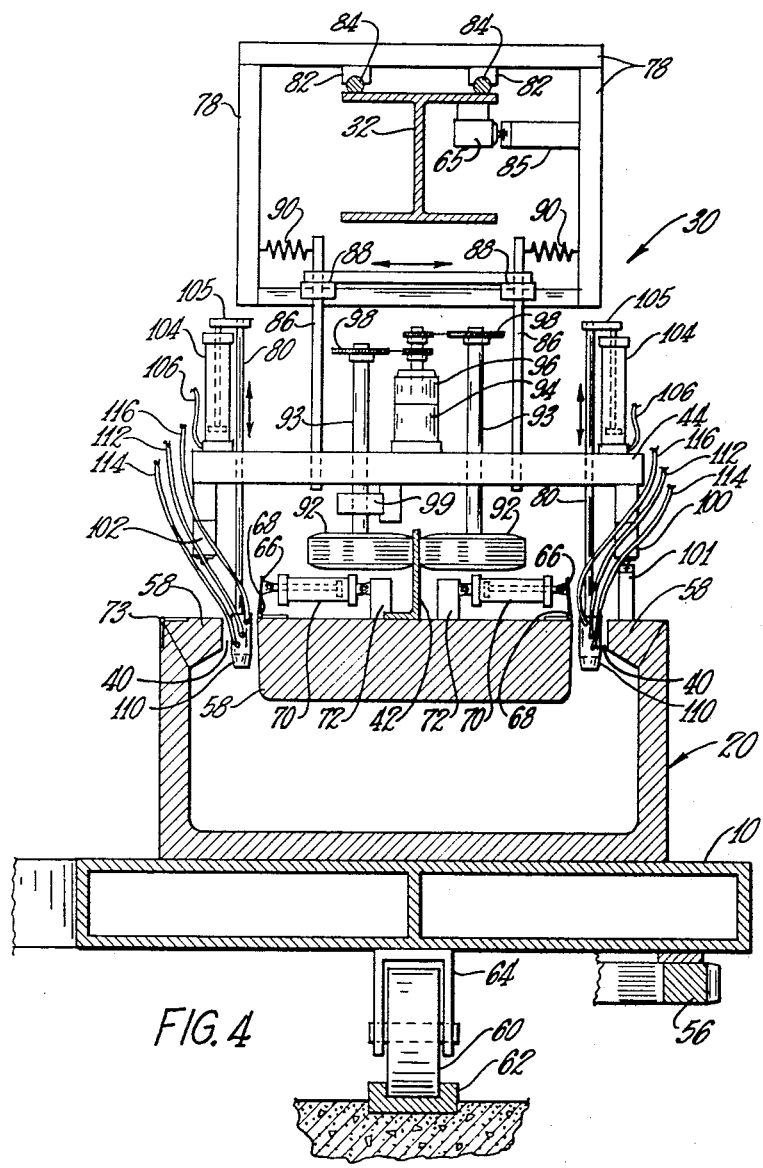
FIG. 4 is a cross-sectional view of the molding apparatus as seen along the line 4—4 of FIG. 1.

Referring now to FIGS. 3 and 4 the mold openings are closed or sealed by flaps 66 which are operable on hinges 68 by hydraulic pistons 70 mounted on struts 72. The mold openings can be sealed shut during the curing phase of the molding operation in order to provide a closed mold.

The top 58 of the mold is openable about hinge 73, and is operated by hydraulic pistons 74 which are mounted on structural members 76 and 77. The top opens after the curing phase of the molding cycle in order to allow removal of the molded article from the mold.

The discharge carriage is comprised of a frame 78, the head spacer bar 44, and vertically movable discharge rods 80. Coaxially mounted at the lower ends of the discharge rods are the discharge heads 110 which distribute the moldable composition into the openings in the mold. The discharge heads receive the components of the foamable composition through the lines 112 and 114, and mix the components before discharge into the mold. An air line 116 can supply air under pressure to purge the discharge head. The details of foam mixing heads and the system of supplying the ingredients are well known in the art, as shown, for example, in U.S. Pat. No. 3,141,865. An adequate discharge head for purposes of this invention is a size No. 4 mixing head by The Martin Sweets Company, Louisville, Kentucky.

The rods are lowered and raised through operation of hydraulic pistons 104 which are connected by braces 105 to the head spacer bar. Hydraulic lines 106 power the hydraulic pistons. During the pouring operation the rods can be lowered so that the heads drop into the mold openings. The frame 78 rests upon and depends from bearing members 82 which are slidably mounted on a track 84. Thus, the entire discharge carriage is freely movable in the longitudinal direction, i.e., in the direction of movement of the mold. This free movement allows the carriage to be pulled along the track when the drive wheels are driving.

Two supports 86 for the head spacer bar depend from sliding bearing members 88 which are slidably mounted on the lower portion of the frame. This sliding attachment allows the head spacer bar to freely move relative to the frame. The movement is in a lateral direction which is perpendicular to the direction of the movement of the mold. The purpose of this free movement in the lateral direction is to allow the discharge heads to be maintained in discharge relation with the openings in the mold as the carriage traverses the mold.

Mounted on the head spacer bar supports 86 are springs 90 which serve to place the head spacer bar in its correct lateral position after the mold leaves the pouring area, in order for the drive wheels to be lined up with the guide member of the next mold. This will insure that the discharge heads are lined up with the mold openings of the oncoming mold.

Rotatably mounted on the head spacer bar are two wheels 92 on axles 93. A variable speed motor 94 operates through a clutch 96 which engages a chain and sprocket 98 to drive the wheels. In the preferred embodiment the motor operates at a constant rate to drive the discharge head at a constant speed relative to the mold. It is also within the scope of this invention to program the motor to drive the discharge head at a preselected pattern of speeds relative to the mold. The wheels are mounted to press inwardly on the guide member in a driving relationship so that there is no slippage between the surface of the wheel and the guide member. The engagement of the wheels with the guide member also serves to position the head spacer bar in the lateral direction, since the head spacer bar is slidably mounted on the frame for free lateral movement.

A disc brake 99 coaxially mounted above one of the wheels serves to lock the axles and wheels in position when the brake is engaged. Engagement of the brake prevents relative movement between the carriage and the mold. At the end of the traverse of the mold by the carriage, the brake is engaged, stopping the relative movement of the carriage. The carriage is then locked to the guide member and rides in the counter-clockwise direction with the mold back to the home position. When the home position is reached the brake is released and the mold passes away from the discharge carriage, which remains in the home position.

Attached to the head spacer bar is limit switch 100 which is tripped by a trip means 101 and limit switch 102 which is tripped by a trip means 103. The limit switches 100 and 102 are shown in FIG. 4, while the trip means 101 and 103 are more clearly shown in FIG. 3. Trip means 101 trips limit switch 100 as the mold first reaches the head spacer bar upon which limit switch 100 is mounted. This occurs prior to the pouring cycle, as the mold is entering the pouring station. This tripping of limit switch 100 initiates the pouring cycle. The tripping of limit switch 102 by trip means 103 signals the completion of the traverse of the mold by the discharge carriage. Attached to the frame 78 is another limit switch 65 which is tripped by trip means 85 mounted on the structural member 32. Limit switch 65 is tripped when the carriage returns to its home position. The tripping of limit switch 100 disengages the brake and allows the carriage separate from the mold.

Figure 9:
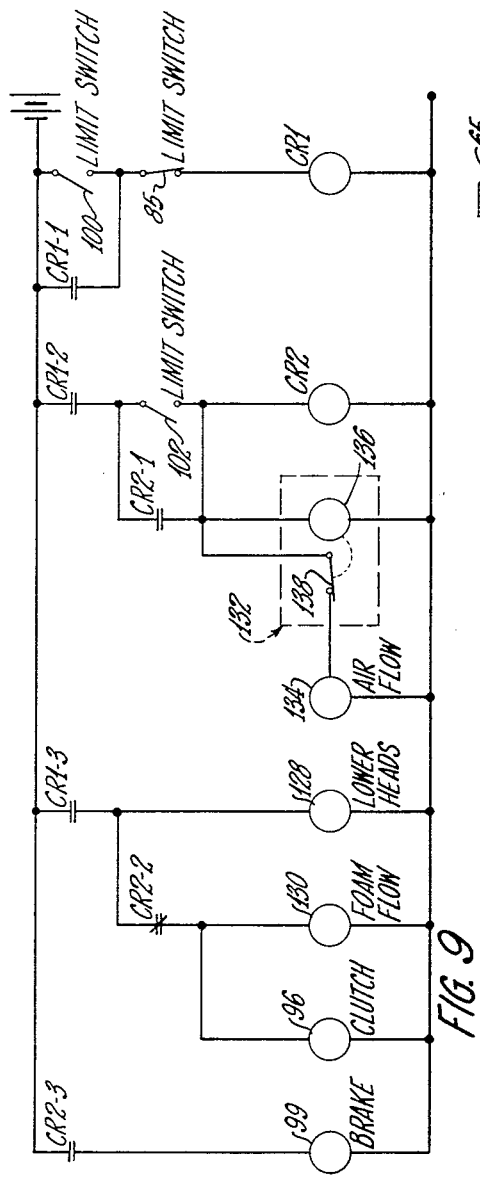
FIG. 9 is a control diagram for the apparatus shown in FIGS. 1-8.

As the mold passes beneath the first cross beam 34 limit switch 100 on the head spacer bar is actuated by trip means 101, setting in motion the pouring cycle. Control relay 1 is energized, closing contacts CR-1-1, CR1-2 and CR1-3, as shown in FIG. 9. The closing of contact CR1-3 energizes solenoid valves 128 and 130, and also engages the clutch. The energization of the solenoid valve 128 controls the supply of hydraulic fluid to the hydraulic piston 104 and thus lowers the discharge rods and discharge heads into the mold openings. The energization of solenoid valve 130 begins the flow of the components of the foamable material through component lines 112 and 114 into the discharge head. The activation of the clutch engages the drive wheels and axles with the drive motor, and the discharge carriage begins its traverse of the mold. The mold and discharge carriage at this point in the pouring process are shown schematically in FIG. 5.

At the end of the traverse of the mold limit switch 102 on the head spacer bar is tripped by trip means 103. Control relay 2 is energized, closing contacts CR2-1 and CR2-3, and opening contact CR2-2. The closing of contact CR2-3 applies the brake. This stops the drive wheels and holds them in place on the guide member. The opening of contact CR2-2, which is normally closed, de-activates the solenoid valve 130 which causes the cessation of the flow of components of the foamable material into the discharge head. The opening of control relay CR2-2 also de-activates the clutch, and thus the driving force of the motor is no longer applied to the wheels. The closing of control relay CR2-1 serves to energize the air purge timer 132. The intially closed switch 138 allows the activation of the air flow solenoid 134. This, in turn, causes a supply of pressurized air to flow through purge air line 116 to purge the discharge head. Meter 136 times the duration of the flow of purging air and opens switch 138 after the predetermined time has elapsed. With switch 138 open, the purging air flow through the discharge head stops. The position of the discharge carriage and mold at this point in the pouring process is shown schematically in FIG. 6.

The discharge carriage then travels in the counterclockwise direction with the mold until the carriage has reached its home position as shown schematically in FIG. 7. Upon reaching the home position trip means 65 trips limit switch 85, which is mounted on the carriage frame. The tripping of limit switch 85, which is normally closed, de-energizes control relay 1. This in turn opens the contacts CR1-1, CR1-2, and CR1-3. The opening of CR1-2 de-energizes control relay 2, which in turn closes contact CR2-2 and opens contacts CR2-1 and CR2-3. The opening of contact CR1-3 de-activates solenoid valve 128 causing the discharge rods and discharge heads to be raised up out of the mold openings. The opening of contact CR2-3 causes a disengagement of the brake, and allows the discharge carriage to separate from the mold.

Upon the separation of the discharge carriage from the mold the head spacer bar becomes free to move laterally, because there is no longer contact between the wheels and the guide member. The springs move the head spacer bar laterally, leaving it in position for the next pouring cycle.

In the event that the mold and carrousel should slow down or stop during the traverse, the predetermined pattern of relative speeds between the discharge carriage and the mold will be adhered to because the mold is used as a frame of reference. Likewise the head spacer bar will be moved laterally as necessary to maintain the discharge heads in discharge relation with the mold openings. In the event the mold and carrousel should stop immediately after the initiation of the pouring cycle, the discharge carriage and mold would appear as shown schematically in FIG. 8 at the end of the traverse. In such a situation the carriage would have traversed a non-moving mold, rather than a moving mold. The significance of this is that even though the mold stopped moving and thus failed to follow its predetermined path, the discharge heads traversed the mold at the proper predetermined speed. The discharge heads, guided by the guide member, have also remained in discharge relation with the mold openings, and the proper amount of material has been deposited in the mold.

A variation of this invention utilizes a timing device and circuit which insert a timed delay in the traverse of the discharge carriage at the beginning of the pouring cycle. The material is thus discharged into the receptacle for a few seconds before the traverse begins. This delay in the traverse allows an initial build-up of foam at the front of the receptacle to overcome the tendancy of the material to flow "downhill" or to level out, i.e., from the front of the receptacle toward the rear of the receptable.

Another variation of this invention provides an appropriate circuit and motor speeds to cause the discharge carriage to travel at a faster speed relative to the mold in shallow portions of the mold and at a slower relative speed in the deeper portions of the mold. Thus it can be seen that a large number of predetermined patterns of speed—all relative to the mold itself—could be provided with the method and apparatus of this invention.

While the preferred embodiment of this invention utilizes wheels in contact with the guide member, it can easily be seen that other methods of driving the discharge carriage relative to the mold could be utilized.

Another variation of this invention utilizes a mold opening that is not a straight line. An appropriately curved guide flange is sufficient to maintain the discharge heads in discharge relation to the mold openings. Thus the molding of articles requiring a curved or non-straight mold opening can be effected by the method and apparatus of this invention. It can be seen that by utilizing the principles of this invention the discharge head can be guided on any desired predetermined path across the mold.

While the preferred embodiment as shown schematically in FIGS. 5–8 displays the discharge carriage mounted for travelling in a direction opposite to that of the travel of the mold, an additional variation of the principles of this invention would have the discharge carriage traversing in the same direction as the mold.

It will be evident from the foregoing that various modifications can be made to this invention. Such, however, are considered as being within the scope of the invention.

What is claimed is:

1. Apparatus for depositing material in a moving receptacle, comprising:
    a. means for moving a receptacle in a straight line path;
    b. means for moving a discharge means for depositing a material in said moving receptacle, said means for moving said discharge means being adapted to maintain a predetermined movement of said discharge means relative to said moving receptacle;
    c. means for continuously sensing movement of said receptacle during said depositing of said material; and,
    d. control means responsive to said sensing means to control movement of said discharge means in a prdetermined pattern of speeds relative to the movement of said receptacle, whatever the movement of said receptacle.

2. Apparatus according to claim 1 wherein said means contacts said receptacle.

3. Apparatus according to claim 1 wherein said responsive control means is adapted to move said discharge means at a substantially constant speed relative to said receptacle.

4. Apparatus for depositing material in a moving receptacle, comprising:
    a. means for moving a receptacle in a straight line path;
    b. means for moving a discharge means for depositing a material in said moving receptacle, said means for moving said discharge means being adapted to maintain a predetermined movement of said discharge means relative to said moving receptacle;
c. means for continuously sensing movement of said receptacle during said depositing of said material; and,
d. control means responsive to said sensing means to control movement of said discharge means along a predetermined path relative to said receptacle, whatever the movement of said receptacle.

5. Apparatus according to claim 4 wherein said control means contacts said receptacle in a driving relation.

6. Apparatus for depositing material in a moving receptacle, comprising:
a. means for moving a receptacle in a straight line path;
b. means for moving a discharge means for depositing a material in said moving receptacle, said means for moving said discharge means being adapted to maintain a predetermined movement of said discharge means relative to said moving receptacle;
c. means for continuously sensing movement of said receptacle during said depositing of said material; and,
d. control means responsive to said sensing means for moving said discharge means in a predetermined pattern of speeds relative to said receptacle and for moving said discharge means in a predetermined path relative to said receptacle, whatever the movement of said receptacle.

7. Apparatus according to claim 6 wherein said sensing means comprises wheels rotatably mounted for contact with said receptacle.

8. Apparatus acording to claim 7 wherein said wheels are mounted on spaced-apart vertical axes and are adapted to contact a vertically upstanding member on said receptacle.

9. A method for depositing material into a moving receptacle comprising:
a. moving a receptacle along a straight line path;
b. discharging material from a movable discharge means into said moving receptacle;
c. continuously sensing movement of said receptacle during said discharging; and,
d. moving said discharge means in a predetermined pattern of speeds relative to said receptacle in response to said sensing, whatever the movement of said receptacle.

10. The method according to claim 9 wherein said sensing is accomplished by a control means which contacts said receptacle.

11. The method according to claim 10 including moving said discharge means at a substantially constant speed relative to said receptacle during the depositing of the material.

12. A method for depositing material into a moving receptacle comprising:
a. moving a receptacle along a straight line path;
b. discharging material from a movable discharge means into said moving receptacle;
c. continuously sensing movement of said receptacle during said discharging; and,
d. moving said discharge means over a predetermined path of movement with respect to said receptacle responsive to said sensing, whatever the movement of the receptacle.

13. The method according to claim 12 wherein said sensing is accomplished by a control means which contacts said receptacle.

14. A method for depositing material into a moving receptacle comprising:
a. moving a receptacle along a straight line path;
b. discharging material from a movable discharge means into said moving receptacle;
c. continuously sensing movement of said receptacle during said discharging;
d. moving said discharge means over a predetermined path relative to said receptacle responsive to said sensing; and,
e. moving said discharge means in a predetermined pattern of speeds relative to the speed of said receptacle responsive to said sensing, whatever the movement of said receptacle.

15. The method according to claim 14 wherein said sensing is accomplished by a control means which contacts said receptacle with rotatably mounted wheels in a driving relationship.

16. The method according to claim 15 wherein said wheels are mounted on said control means on spaced-apart vertical axes, and wherein said wheels contact a vertically upstanding member on said receptacle.

17. The method of claim 16 in which said wheels contact said vertically upstanding member in a wringer-type relation to drive said discharge carriage.

18. The apparatus of claim 8 in which said wheels are adapted to grasp said guide member in a wringer-type relation to drive said discharge means.

* * * * *